July 16, 1940.  A. E. BACHELET  2,208,241
ELECTRICAL TIMING MECHANISM
Filed March 1, 1939
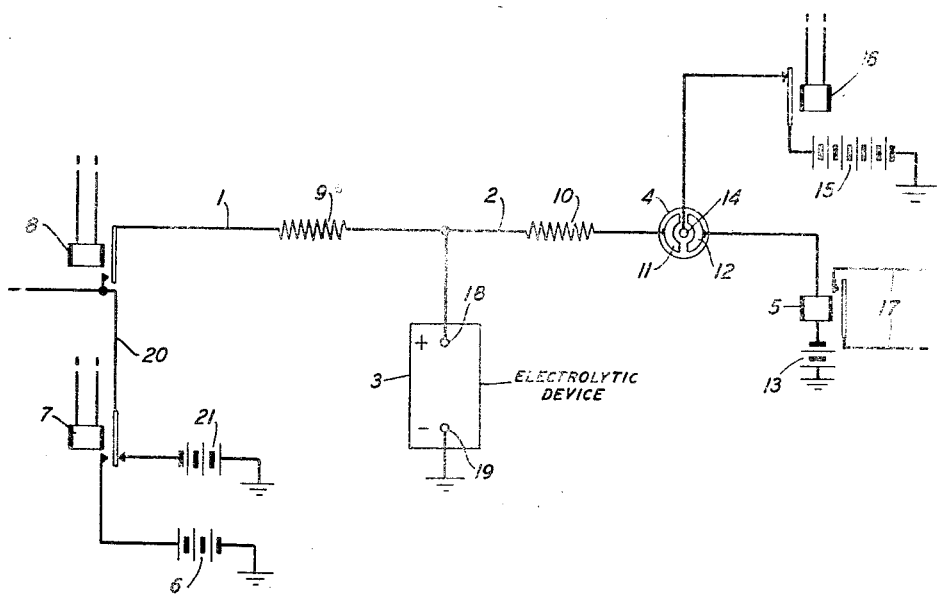
INVENTOR
*A. E. BACHELET*
BY
*M. T. McKenney*
ATTORNEY Patented July 16, 1940

2,208,241

UNITED STATES PATENT OFFICE 2,208,241

ELECTRICAL TIMING MECHANISM

Albert E. Bachelet, New York, N. Y., assignor to Bell Telephone Laboratories, Incorporated, New York, N. Y., a corporation of New York Application March 1, 1939, Serial No. 259,303

8 Claims. (Cl. 175—183)

This invention relates to electrical timing mechanisms and particularly to circuit arrangements for measuring desired intervals of time.

The objects of the invention are to obtain a high degree of accuracy in the measurement of time intervals; to determine the conditions under which measuring operations should occur; to facilitate and simplify the immediate restoration of the measuring circuits to their normal condition; and to secure other improvements in mechanisms of this kind.

Various time measuring circuits have been proposed heretofore making use of the principle that the time required to charge a condenser to a value necessary to produce ionization in the control gap of a gas-filled discharge tube can be fixed accurately by selecting the resistance of the charging circuit. The ionization of the control gap, when the condenser has attained the proper charge, produces current flow in the main gap of the tube, and a work relay in the anode circuit operates to mark the completion of the measured interval.

Since it is often desirable to use these timing circuits for purposes which require the immediate restoration of the timing circuit to its normal condition following use, and since the ordinary condensers used in these devices hold their charges for indefinite periods of time, it has been necessary in the past to provide circuit means for discharging the condensers in order that the circuit may be ready immediately for the next use.

Furthermore, it has not been possible in these prior timing systems, to discriminate between polarities of the voltages applied to charge the timing condenser. This is true because the ordinary condenser assumes a charge regardless of the polarity of the voltage applied across its terminals and for the further reason that the gas-filled discharge devices used in these circuits ionize their control gaps without regard to the direction of the potential applied across the control electrodes.

According to the present invention improvements are secured over these prior arrangements by means of a timing circuit in which an electrolytic condenser has a particular one of its terminals connected to the charging circuit through a resistance element and also to the control electrode of a gas-filled tube and the other one of its terminals in electrical connection with one pole of the charging source of potential and also in electrical connection with the other control electrode of the tube. The electrolytic condenser, having a definite polarity, will receive and accumulate a charge only when voltage of a given polarity is applied to its terminals. If voltage of the opposite polarity is applied, the condenser acts as a low resistance conducting path for the flow of current and refuses to accumulate a charge. By reason of this characteristic the condenser, when connected to the charging circuit and to the control gap of the tube as above explained, will, when charging potential of the proper polarity is applied, accumulate a charge and cause the operation of the tube to indicate the measurement of the desired interval of time; but, if a voltage of the wrong polarity is for any reason applied to the charging circuit, the condenser will act as a low-resistance path for the flow of current in the charging circuit, preventing the application of this voltage to the tube, and preventing consequently the operation of the tube to indicate the measurement of the time interval.

A further feature of the invention which follows from the use of the electrolytic condenser is the ability of the time measuring circuit to restore rapidly to its normal condition ready for the next use as soon as the charging voltage is removed and without the necessity of any extraneous circuits for discharging the condenser. This feature is realized through the inherent characteristic of the electrolytic condenser whereby an accumulated charge dissipates itself rapidly as soon as the charging voltage is removed.

The foregoing and other features of the invention will be discussed more fully in the following detailed specification.

The drawing accompanying this specification illustrates one embodiment of the invention.

The timing mechanism disclosed in the drawing includes a charging circuit 1, a discharge circuit 2, an electrolytic impedance device 3, a space-discharge tube 4, a work relay 5, and a source of charging potential 6. More specifically the charging circuit includes the source 6, the contacts of control relays 7 and 8, a resistance element 9, and the electrolytic device 3; and the discharging circuit includes the electrolytic device 3, a resistance element 10, the control gap of the tube 4, which is formed by the control electrode 11 and the cathode 12, the winding of the work relay 5, and the source of potential 13. The main discharge gap of the tube 4, which is formed by the anode 14 and cathode 12, is included in the anode circuit of the tube together with the anode battery 15, the work relay 5 and battery 13. The anode circuit also passes through the normally closed contacts of a relay 16, the purpose of which is to open the anode circuit and quench the main discharge gap.

The desired interval of time is measured by charging the electrolytic device 3 as a capacitance until the accumulated charge thereon has a potential which is sufficient to ionize the control gap of the tube 4. The time interval may be determined at any desired value by selecting the value of the resistance element 9 such that the charging current flowing from the source 6 through the element 9 and into the device 3 is just sufficient to raise the potential of the device 3 to the point where the tube ionizes at the completion of the desired interval.

When the charge on the device 3 reaches the ionizing potential of the control gap of the tube, discharge occurs, first across the control gap and then across the main gap of the tube, and current flows in the anode circuit, operating the relay 5. The purpose of resistance 10 is to protect the electrodes 11 and 12 of the tube by limiting the amount of current that can flow from the condenser when ionization occurs.

As explained above, the electrolytic condenser 3 is essentially a polarized device; it will receive and accumulate a charge when potential of the proper polarity is applied, and it will act like a low resistance if potential of the opposite polarity is applied to its terminals. In the present timing circuit, therefore, the positive terminal 18 of the condenser 3 is connected to the charging circuit 1 and the negative terminal 19 is connected to ground, since it is desirable to have the timing circuit function only when positive potential is applied to the charging circuit 1. The time measuring circuit may, for example, be utilized in systems where both positive and negative sources of potential are present and where positive potential only is applied to the operating circuit 1 in the normal operation of the system; yet the charging circuit 1 may be exposed to the negative source of potential in the event of some unstandard or inadvertent operation. In such a case the condenser 3 serves the double purpose of measuring the desired interval of time under standard conditions and safeguarding the measuring circuit against false operation when an unstandard condition occurs.

Also as explained above the condenser 3 has the property of rapidly dissipating any charge it may have accumulated immediately that the impressed source of potential is removed. This characteristic is due to the inherent low resistance which the electrolytic condenser offers to the flow of direct current between electrodes. When, therefore, the source of charging potential is removed from the charging circuit 1, the condenser 3 immediately dissipates its accumulated charge so that the measuring circuit will in a short interval be ready for the next use. This is an important feature where it is necessary to measure intervals of time with a high degree of accuracy. Since the measured interval is the time required to charge the condenser from its uncharged condition to the potential required to ionize the tube 4, it is obviously essential that the condenser be fully discharged at the instant the measuring circuit is taken in use.

For a detailed description of electrolytic devices reference is made to the book "Electrolytic Capacitors" by Deeley published in 1938 by the Cornell-Dubilier Electric Corporation, South Plainfield, New Jersey.

Supplementing the foregoing description, a brief explanation will now be given of the manner in which the measuring system operates. Preparatory to the commencement of the measuring operation a relay 7 is energized to connect the positive pole of the charging battery 6 to the conductor 20. As soon thereafter as it is desired to start the measurement a relay 8 is energized to extend the conductor 20 into connection with the charging circuit 1. The source of potential 6 being thus applied across the terminals of the condenser 3, charging current begins to flow into the condenser through the resistance 9. The rate of flow and, accordingly, the time required to charge the condenser 3 to the desired voltage, depend directly upon the value of the resistance 9. At the end of the interval undergoing measurement the condenser 3 has acquired the desired voltage, and the control gap of the tube 4 ionizes in the discharge circuit. This circuit extends from the positive pole of the condenser 3, over conductor 2, through the current limiting resistance 10, across the gap formed by the control electrode 11 and the cathode 12, through the winding of relay 5 to the negative pole of battery 13 and thence to ground. Since the voltage of the condenser 3 and the voltage of the battery 13 are in series-aiding relation, the voltage applied across the control gap of the tube is determined by the sum of these voltages. Upon ionization of the control gap of the tube 4 the main discharge gap of the tube, formed by the anode 14 and the cathode 12, discharges, and current flows in the work circuit of the tube. This circuit may be traced from the positive pole of the anode battery 15, contacts of relay 16, anode 14, cathode 12, winding of relay 5, to the negative pole of battery 13 and thence to ground. The relay 5 operates in this circuit and closes its contacts to mark the end of the measured interval. The closed circuit 17 may serve to perform any desired function. At any convenient time thereafter the charging circuit 1 may be opened by releasing relay 8.

Inasmuch as the anode discharge continues in tubes of this type independently of the control gap, it is necessary to quench the anode discharge by some additional means. In the system illustrated this is accomplished by a control relay 16, which can be operated at any desired time to open the anode circuit and restore the tube to its normal condition.

In order to explain the protective feature of the condenser 3 it will now be assumed that potential of the wrong polarity is applied to the charging circuit 1. For example, assume the relay 8 is inadvertently operated prior to the operation of relay 7. In this event the negative pole of the source 21, which is normally connected to conductor 20, is now applied to the charging circuit 1 and thence to the positive terminal of the condenser 3. If the voltage of source 21 exceeds the ionizing voltage of the tube by the biasing voltage of battery 13, the source 21 would in time, except for the polarity characteristic of the condenser 3, act to establish on the condenser a charge sufficient to operate the tube 4 and the relay 5. This inadvertent operation is prevented, however, since the condenser 3 now acts as a low resistance and permits current to flow in a circuit including the battery 21, condenser 3, and resistance 9. This flow of current in the charging circuit prevents the condenser from accumulating a charge and also reduces the voltage that can be applied across electrodes 11 and 12 of the tube. Hence ionization of the tube cannot occur since the condenser 3 acts as a low resistance shunt to reduce the effective potential applied across the electrodes of the tube.

It has been assumed that the commencement of the measured interval is concurrent with the energization of the relay 8. According to the uses to which the measuring circuit is applied, it may be necessary to operate relay 8 at random in response to the occurrence of events over which the system has no control. And it is for this reason that the ability of the conductor 3 to immediately discharge itself is of particular advantage.

While the invention does not depend upon any particular form of electrolytic condenser, it may be mentioned that these condensers may be of the wet type or of the dry type and that either one may be used in the measuring circuits herein disclosed.

What is claimed is:

1. The combination in a mechanism for measuring intervals of time of a gas-filled discharge tube having a control gap and a main discharge gap, a charging circuit, a source of potential and means for applying the same to said charging circuit, an impedance element in said charging circuit serving as a capacitance to accumulate a charge when potential of a given polarity is applied to the charging circuit and serving as a resistance to permit the flow of current therethrough when potential of the opposite polarity is applied, a resistance unit in said charging circuit for limiting the charging current to the value necessary to charge said element to the ionization voltage of said control gap in the interval of time to be measured, a discharge circuit connecting said impedance element across said control gap to ionize the same when the charge on said element reaches the ionization value, a work circuit including the main gap of said tube, and means in said work circuit operative in response to ionization of the control gap to indicate the termination of the measured interval.

2. The combination in a time measuring mechanism of a gas-filled discharge tube having a control gap, a charging circuit, a source of potential and means for applying the same to said charging circuit, an impedance element in said charging circuit serving either as a capacitance to accumulate a charge or as a low resistance to prevent the accumulation of a charge thereon according to the polarity of the potential applied to said charging circuit, a resistance unit in said charging circuit for limiting the flow of current to the value necessary to charge said impedance element to the ionization voltage of said control gap in the interval of time to be measured, circuit means connecting said impedance element across said control gap to ionize the same when the charge on said element reaches the ionization value, and a work circuit for said tube having a relay therein responsive to the ionization of said control gap to mark the termination of the measured interval.

3. In a mechanism for the measurement of time intervals, a space discharge tube having an anode and a cathode and a control electrode, a charging circuit, a source of voltage and means for applying the same to said charging circuit, an electrolytic impedance device in said charging circuit which acts as a condenser to accumulate a charge when said source of voltage is applied to the charging circuit in a given direction and which acts as a resistance element to permit the flow of current therethrough without accumulating a charge when said voltage source is applied in the opposite direction, resistance means in said charging circuit having such a value that the current flowing therein charges said impedance device to a definite potential in the interval of time to be measured, means permanently connecting said impedance device across the control electrode and cathode of said tube for the purpose of rendering said tube conducting when the charge on said impedance device reaches said definite potential, and means in circuit with the anode of said tube operative when the tube becomes conducting to mark the termination of the measured interval of time.

4. The combination in a mechanism for measuring intervals of time of a gas-filled discharge tube having a control gap and a main discharge gap, a charging circuit, a source of potential and means for applying the same to said charging circuit, an impedance device in said charging circuit which has the capability of accumulating a charge while said source of potential is being applied to the charging circuit and which also has the inherent property of rapidly dissipating its charge to restore said mechanism to its normal condition as soon as the applied potential is removed, a resistance unit in said charging circuit for limiting the charging current to the value necessary to charge said element to the ionization voltage of said control gap in the interval of time to be measured, a discharge circuit connecting said impedance element across said control gap to ionize the same when the charge on said element reaches the ionization value, a work circuit including the main gap of said tube, and means in said work circuit operative in response to ionization of the control gap to indicate the termination of the measured interval.

5. The combination in a mechanism for measuring intervals of time of a gas-filled discharge tube having a control electrode and a cathode and an anode, a charging circuit, a source of potential, means for connecting said source to said charging circuit for intervals of time which may be greater or less than the interval of time to be measured by said mechanism, an electrolytic impedance device in said charging circuit which has the capability of accumulating a charge while said source of potential is being applied to the charging circuit and which also has the inherent capability of dissipating any charge it has received immediately that the charging potential is disconnected from said charging circuit, resistance means in series with said impedance device for limiting the charging current to the value necessary to charge said device to a definite potential value in the interval of time to be measured, circuit means permanently connecting said impedance device across the control electrode and cathode of said tube to produce ionization within the tube as soon as the charge on the impedance device reaches said definite potential value, a main circuit for said tube including the anode and cathode elements, and a relay in said main circuit operated upon ionization of the tube for the purpose of indicating the end of the measured time interval.

6. The combination in a mechanism for measuring time intervals of a space discharge tube having an anode and a cathode and a control electrode, a charging circuit, a source of voltage having positive and negative terminals, means for connecting either the positive or the negative terminal of said source to said charging circuit, an electrolytic impedance device in said charging circuit which acts as a condenser to accumulate a charge when the positive terminal of said source is connected to the charging circuit and which acts as a resistance element to permit the flow of current therethrough without accumulating a charge when the negative terminal of said source is connected to the charging circuit, resistance means in said charging circuit having such a value that current flowing in the proper direction therein charges said impedance device to a definite value in the interval of time to be measured, means permanently connecting said impedance device across the control electrode and cathode of said tube for the purpose of rendering said tube conducting when the charge on said impedance device reaches said definite potential, and means in circuit with the anode of said tube for marking the termination of the measured interval.

7. The combination in a mechanism for measuring intervals of time of a space discharge tube having an anode and a cathode and a control electrode, a charging circuit electrically connected to the control electrode of said tube, a source of potential of positive polarity and a source of potential of negative polarity, means for connecting either the positive or the negative source of potential to said charging circuit, an electrolytic impedance device connected in said charging circuit which serves as a condenser to accumulate a charge when positive potential is applied to the charging circuit and which serves as a conductive element for the flow of current therethrough when negative potential is applied to the charging circuit to prevent the application of ionizing potential to said control electrode, resistance means in said charging circuit having such a value that current flowing in the proper direction therein charges said impedance device to a definite value in the interval of time to be measured, means permanently connecting said impedance device across the control electrode and cathode of said tube for the purpose of rendering said tube conducting when the charge on said impedance device reaches said definite potential, and means in circuit with the anode of said tube for marking the termination of the measured interval.

8. The combination in a mechanism for the measurement of time intervals of a space discharge tube having two electrodes forming a gap, a source of positive potential, a source of negative potential, a conductor extending from said sources to one of said electrodes, a first resistance element and a second resistance element included in series in said conductor, relay means for applying either the positive or the negative source of potential to said conductor, an electrolytic device connected to said conductor intermediate said first and second resistance elements which serves when positive potential is applied to said conductor to accumulate a charge in response to current flowing through said first resistance element and which serves to conduct the current flowing through said first resistance element without accumulating a charge when negative potential is applied to said conductor to prevent the application of said potential to the said electrode of said tube in sufficient magnitude to ionize the tube, said first resistance element having such a value that current flowing therein in the proper direction charges said device to a definite potential in the interval of time to be measured, and means including said second resistance element for connecting said device across the gap of said tube for the purpose of ionizing the tube when the charge on said device reaches said definite potential.

ALBERT E. BACHELET.